United States Patent Office 2,880,201
Patented Mar. 31, 1959

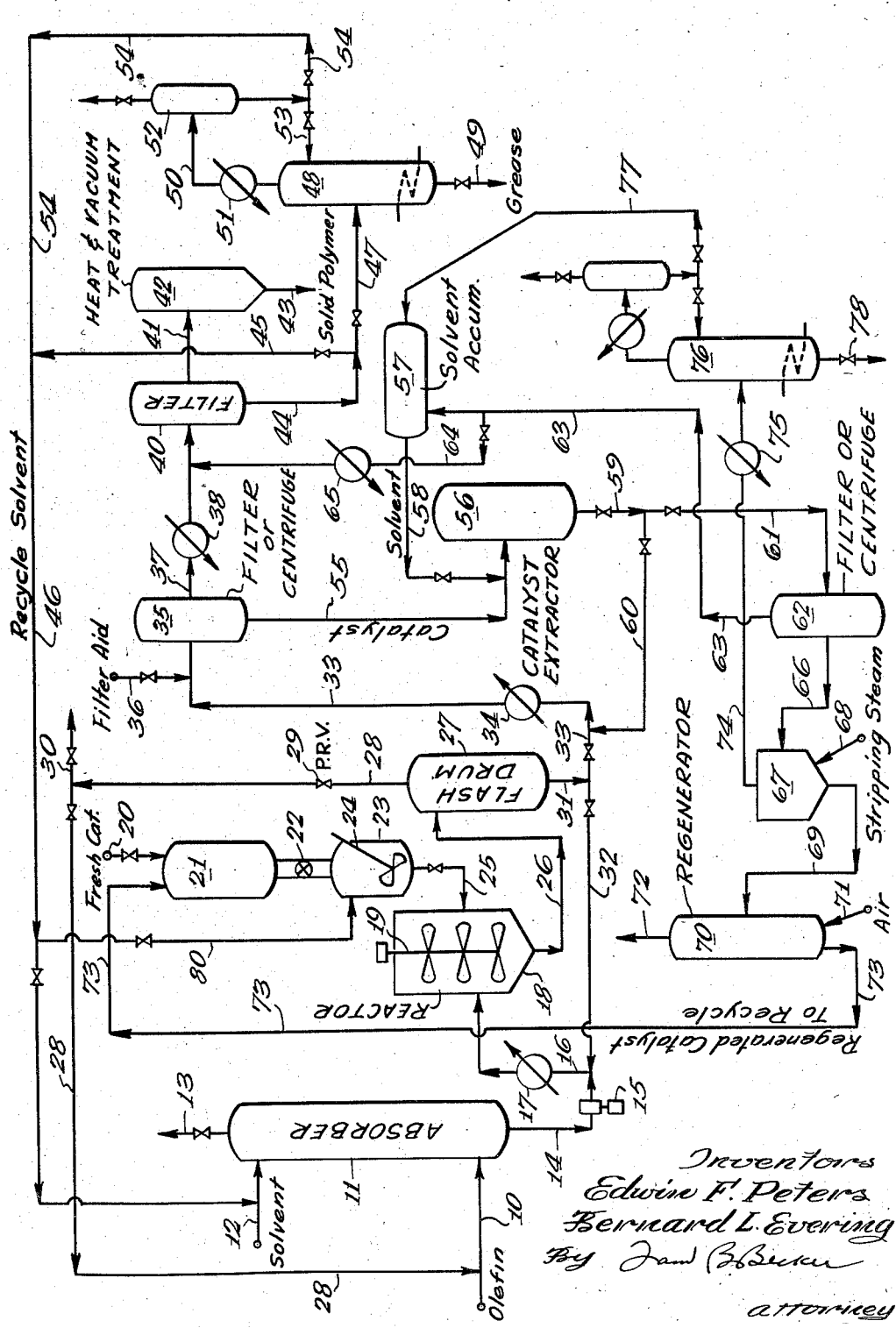

2,880,201

CATALYTIC PROCESS

Edwin F. Peters, Lansing, and Bernard L. Evering, Chicago, Ill., assignors to Standard Oil Company, Chicago, Ill., a corporation of Indiana Application October 2, 1956, Serial No. 613,474

12 Claims. (Cl. 260—94.9)

This invention relates to a novel process for the polymerization of ethylene in which a readily regenerable catalyst is employed. More specifically, this invention provides a process for the conversion of ethylene-containing charging stocks to normally solid or resinous polymers upon contact with a catalyst consisting essentially of an oxide of vanadium whose surface is free of sorbed hydrogen, preferably extended upon a major proportion by weight of an inert solid supporting material, such as gamma-alumina or high surface area aluminosilicates, magnesia, titania, zirconia or the like.

One object of our invention is to provide novel, readily regenerable catalysts for the preparation of high molecular weight polymers from ethylene-containing gas mixtures. Another object is to provide a novel regenerative process for the polymerization of ethylene. An additional object is to provide processes for the conversion of ethylene-containing charging stocks to normally solid polymers using catalysts which can be regenerated by combustion of occluded carbonaceous deposits and which can then be returned directly to the polymerization zone. These and other objects of our invention will become apparent from the following description thereof.

Briefly, the inventive process comprises the polymerization of ethylene to produce normally solid polymers by contact with a catalyst consisting essentially of an oxide of vanadium, such as $V_2O_5$ or $V_2O_3$, whose surface is free of (sorbed) hydrogen, extended upon a major proportion by weight of an inert solid supporting material. We prefer to employ porous, mechanically stable supports having relatively high surface area (at least 100 square meters per gram), such as gamma-alumina, magnesia, titania, zirconia, various aluminosilicates, or other difficultly reducible metal oxides having similar properties. The polymerization process can be conducted at temperatures between about 35° C. and about 260° C., employing ethylene in the gas phase or in solution in a liquid reaction medium such as a liquid hydrocarbon. The pressure in the polymerization reaction zone can be varied upwardly from about 50 p.s.i.g. to the maximum pressure which the reaction equipment can withstand, for example, 20,000 or 30,000 p.s.i.g. or even more, but is usually selected within the range of about 200 to about 2000 p.s.i. The residence time of ethylene in the polymerization zone is adjusted to a desired value in order to obtain substantial conversion thereof to high molecular weight, normally solid polymers.

Following the polymerization reaction, the partially spent catalyst can be extracted in the reaction zone or elsewhere with the aid of suitable solvents, such as various hydrocarbons which do not polymerize under the extraction conditions, preferably at temperatures between about 85° C. and about 250° C., in order to remove a substantial proportion of the occluded solid polymer formed by the polymerization of ethylene. The extracted catalyst can then be subjected to oxidation with oxygen-containing gases or otherwise in order to effect oxidation of the carbonaceous residue remaining in the catalyst to form gaseous products ($CO$, $CO_2$, water) which are separated from the catalyst. The catalyst thus regenerated can be returned to the reaction zone, usually as a slurry in a liquid hydrocarbon reaction medium such as pentane, heptane, benzene, xylenes, 1-nonene, isononenes or the like. The process of the present invention does not require the use of promoters such as the highly reactive metals or their hydrides or hydrocarbon derivatives (alkali metal alkyls, aluminum alkyls, etc.), with resultant simplification of the process and elimination of the hazards associated with the preparation and use of such promoters.

The essential catalyst component in our process is an oxide of vanadium, such as $V_2O_3$ and/or $V_2O_5$, although even lower oxides of vanadium may be formed in the reaction zone or may be added. A wide variety of methods are available for the production of vanadium oxide catalysts comprising a minor proportion of said oxide extended upon a major proportion of an inert supporting material. A review of these methods has been provided in "Catalysis—Volume One—Fundamental Principles (Part I)," pages 328–9, edited by P. H. Emmett (Rheinhold Publishing Corp., N.Y., 1954). Other methods are readily found in the literature. In general, vanadium can be deposited upon the selected supporting material by cogelling or impregnation through the use of various vanadium salts, such as the chlorides, oxalates, formates, acetates, chelates (acetoacetates or the like, as in U.S.P. 2,734,874), followed by drying and calcination at temperatures between about 300° C. and about 900° C. for about 2 to about 20 hours in the presence of oxygen or air. It will be understood that the various vanadium oxide catalysts are not all precise equivalents for the purposes of our invention and that the ethylene polymerization rate, etc., will be influenced somewhat by the vanadium oxide concentration in the finished catalyst, the surface area of vanadium oxide which is available for catalysis, the specific state of oxidation of the vanadium and other variables, all these factors being well understood in the art of catalytic polymerization of ethylene and the like.

The following examples are intended to illustrate our invention but not unduly to limit the same.

The following method of catalyst preparation was used in the examples. Seventy grams of oxalic acid dihydrate ($H_2C_2O_4.2H_2O$) were dissolved in 200 cc. of distilled water at 60 to 100° C. Then 31.6 g. of pure $V_2O_5$ were slowly added to the oxalic acid solution at about 90 to 100° C. with stirring, the rate of addition being controlled by the rate the $V_2O_5$ dissolves and the rate of gas evolution. The solution was heated at 90 to 100° C. for about 15 to 30 minutes after the last addition of $V_2O_5$ and then was filtered hot into a 250 ml. glass stoppered graduated cylinder. The filter paper was washed with hot distilled water and the volume made up to 250 ml. at 25° C. This stock solution of soluble blue vanadium complex contained the equivalent of 0.126 g. $V_2O_5$ per ml. of solution. In a 150 ml. beaker was charged 50 ml. of distilled water and then 63.4 ml. of the stock vanadium oxalate solution which is equivalent to 8.0 g. $V_2O_5$. In a casserole were placed 80.6 g. of ⅛-inch pilled gamma alumina. Then the 113.4 ml. of vanadium oxalate solution was poured onto the alumina and the mixture was evaporated to dryness with stirring at 100° C. The catalyst was then placed in a muffle furnace and heated from 80° F. to 900 to 1000° F. The finished catalyst was a bright canary yellow; 85.4 g. of the catalyst contained 9.4 weight percent $V_2O_5$ and was stored in a jar in the presence of air. The portion of catalyst to be used in making a run was either calcined or reduced just prior to use, as indicated in the examples. The 11 weight percent $V_2O_5$-on-$Al_2O_3$ catalyst was made by the same technique.

The reactors were 300 cc. Aminco rocker bombs, made either of stainless steel or mild steel. The reactor was heated electrically by a well insulated furnace. The temperature was recorded and controlled to ±5° F. by means of a Bristol controller and recorder activated by an I.C. thermocouple in the wall of the bomb.

A thoroughly clean and dry reactor at 25° C. being flushed with high purity nitrogen was charged with the desired amount of solvent. Then the activated catalyst was charged and the reactor was sealed and placed in the furnace. Sometimes ethylene (high purity) was charged immediately (400–600 p.s.i.g.) after flushing with ethylene and the mixture heated to reaction temperature or the mixture was heated to reaction temperature and then ethylene was charged. The reactor was rocked for 2–6 hours at temperature and then was cooled.

Pressure was then released from the vapor phase of the cooled reactor (25° C.) through a Dry Ice condensing system followed by a wet test meter. The reactor was then opened and its contents either poured out or dug out, depending upon the amount of polymer produced. Weights on Dry Ice condensate, reactor contents and wet test meter gases gave a material balance. The reactor contents were then subjected to extraction with 2.5 liters of xylene in an insulated Soxhlet extractor so that the temperature of refluxed xylene from the condenser was 100° C. After 8 to 16 hours of extraction, the xylene-polymer solution was cooled to 25° C. The resultant precipitated polymer was filtered, washed with 3–100 cc. portions of acetone in a mixer (Waring Blendor; registered T.M.) and then dried in a vacuum oven at 100° C. for 8 hours. The remaining xylene solution and acetone washings were distilled to recover oil boiling above 150° C. The extracted catalyst was dried in a vacuum oven at 150° C. for 8 hours and weighed. The gain in weight over that charged was due to high molecular weight polymer not yet extracted. The extracted catalyst was then placed in a muffle furnace and heated to 1000 to 1200° F. to burn off the polymer not extracted. The burned catalyst was weighed again and almost always checked the weight of the original charge by ±0.2 g.

The following data were obtained:

Table

| Example | 1 | 2 | 3 | Run A |
|---|---|---|---|---|
| Catalyst Charged: | | | | |
| Wt. percent $V_2O_5$ on $Al_2O_3$ | 11 | 11 | 9.4 | 11 |
| $V_2O_5$–$Al_2O_3$ Catalyst, g. | 10.0 | 34.8 | 34.6 | 10.0 |
| Catalyst Calcination (in air): | | | | |
| Temp., ° C. | 540 | 590 | 510 | |
| Time, Hrs. | 12 | 12 | 12 | |
| Catalyst Reduction: | | | | |
| Temp., ° C. | | | | 460 |
| Press., p.s.i.g. $H_2$ | | | | Atm. |
| Time, Hrs. | | | | 12 |
| Hydrocarbons Charged, g.: | | | | |
| Ethylene | 21 | 37 | 29 | 19 |
| Benzene | 87 | 87 | | 91 |
| n-Heptane | | | a 68 | |
| Total | 108 | 124 | 97 | 110 |
| Polymerization Conditions: | | | | |
| Temp., ° C., Initial | 26 | 130 | 27 | 26 |
| Temp., ° C., Final | 260 | 132 | 124 | 260 |
| Press., p.s.i.g., Initial | 300 | 1,000 | 480 | 300 |
| Press., p.s.i.g., Final | 1,400 | 1,000 | 1,010 | 1,360 |
| Running Time, Hrs. | 5 | 5.5 | 5 | 5 |
| Products Produced, g.: | | | | |
| Liquid | 1.1 | 3.8 | 0.6 | 0 |
| Solid | 2.6 | 3.6 | 6.2 | 0 |
| Total | 3.7 | 7.4 | 6.8 | 0 |
| Properties on Solid Polymer: | | | | |
| Density (24/4° C.) | | 0.9552 | | |
| Melt Viscosity at 145° C. | | 1.95×10⁷ | | |
| Specific Vis. ($N_{sp}\times 10^3$) | 62,000 | | b 28,000 | | a Color changes from yellow to green in $V_2O_5$ catalyst at room temperature upon adding heptane.
b Taken on 0.3 g. polymer extracted from catalyst with hot xylenes at 110° C.

From the foregoing examples it will be noted that ethylene was readily converted to high molecular weight, normally solid polymers by the process of the present invention. In run A, in which the catalyst was pretreated before use with hydrogen, it will be noted that no polymers whatsoever were produced. We have observed that supported $V_2O_5$ catalysts undergo a color change (from yellow to green) indicating at least partial reduction thereof to $V_2O_3$ upon contact with reducing hydrocarbon solvents such as the normally liquid, saturated hydrocarbons (e.g. pentane or heptane) at temperatures within the range used in the present invention. This partial reduction of $V_2O_5$ is apparently not prejudicial to the polymerization reaction. However, the presence of adsorbed hydrogen in the catalyst prevents polymerization, as shown in run A.

Further details of our invention are set forth hereinafter, together with a description of the accompanying figure, which illustrates a preferred method for effecting the polymerization-regeneration process of the present invention.

The essential polymerization charging stock for our process is ethylene. It may, however, be used with methane, ethane, propane or the like (as sometimes occurs in petroleum refinery streams of ethylene). Other unsaturated hydrocarbons may be included with the ethylene charge and may undergo polymerization therewith to some extent, for example, propylene or other monoolefinic hydrocarbons, such as the n-butylenes, pentenes, hexenes, t-butylethylene and the like; conjugated dienes such as butadiene, isoprene, divinylbenzenes, etc. When comonomers are employed with ethylene, they are usually charged in proportions between about 1 and about 25% by weight, based on the weight of ethylene.

The concentration of vanadium oxide in the supported catalyst can be varied from about 1 to about 50% by weight, usually between about 5 and about 25% by weight. The catalysts may contain other metal oxides than those of vanadium and the supports in order to obtain desired physical and mechanical properties, provided said added metal oxides (other than $V_2O_5$) do not in themselves function as catalysts for the polymerization of ethylene to form normally solid polymers under the conditions of the present invention. Thus, we may use supported mixtures of CoO and $V_2O_5$ or cobalt vanadate or the like.

It is desirable to minimize or avoid the introduction of carbon dioxide, water or sulfur compounds into the catalyst, either directly or through the olefin charging stock or liquid hydrocarbon reaction medium. Known methods for the purification of the olefin charging stock and liquid hydrocarbon reaction medium to remove the aforesaid noxious impurities can be used in effecting our invention; they need not be further described herein since they do not constitute the invention.

While ethylene can be polymerized in the gas phase and in the absence of a liquid reaction medium, the employment of such a medium is desirable in order to obtain increased rates of ethylene polymerization and to effect extraction of normally solid polymers from the catalyst. Various classes of hydrocarbons or their mixtures which are liquid and substantially unreactive with ethylene under the polymerization reaction conditions can be employed as reaction media or solvents in our process. Thus, we can employ various normally liquid, saturated hydrocarbons (alkanes and cycloalkanes), unreactive alkenes, e.g. octenes, nonenes, hexadecenes, cyclohexene, etc., or aromatic hydrocarbons such as benzene, toluene, xylenes, etc. A detailed listing of suitable solvents is set forth in Field and Feller U.S.P. 2,691,647.

The concentration of ethylene in the solvent or liquid hydrocarbon reaction medium can be varied from about 2 to about 50% by weight, more often about 2 to 10% by weight, preferably about 2 to 5% by weight.

In general, the polymerization process is effected at temperatures within the range of about 35° C. to about 260° C. More often, temperatures within the range of about 80° C. to about 220° C. are selected to obtain the most desirable polymerization rates, the most desirable products and the most desirable product distribution (resins, greases, etc.). A preferred temperature range is between about 90° C. and about 180° C.

The polymerization pressure is usually set at 100 p.s.i.g. or more, extending up to 30,000 p.s.i. or up to the operating limit of the polymerization equipment. However, the present process does not require extreme pressures to obtain desirable rates of polymerization and usually pressures between about 200 and about 2000 p.s.i.g., measured at the selected polymerization temperature, can readily be employed. It will be understood that the polymerization pressure will be selected to obtain a desired concentration of ethylene in the reactor and to obtain that ethylene in the desired phase, usually in solution in the selected liquid hydrocarbon reaction medium.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually between about 0.1 and about 10 volumes, preferably about 0.5 to 5 or about 2 volumes of ethylene solution in a liquid reaction medium.

In batch operations, operating periods of between about one-half and about 10 hours, usually between about 1 and about 10 hours, are employed and the reaction autoclave is charged with ethylene as the pressure falls as a result of the ethylene conversion reaction.

The solvent:catalyst weight ratio can be varied in the range of about 5 to about 3000, or even higher for flow systems.

The accompanying figure is an illustrative flow diagram indicating a preferred method of practicing our invention. In the interests of simplification, we have eliminated details which are well understood to chemical engineers, such as various valves, heat exchangers, pumps, compressors, etc. The charging stock, ethylene or an ethylene-containing gas mixture, is passed through line 10 into an absorber 11. The ethylene charging stock is suitably purified by known methods to remove water, $CO_2$, sulfur compounds, etc., so that it usually contains not more than 50 p.p.m. of oxygen, not more than about 10 p.p.m. of $CO_2$ and has a dew point below about −45° C. A suitable solvent which functions also as a liquid hydrocarbon reaction medium (heptane, benzene or the like) is introduced into the upper portion of the absorber through line 12. The absorption conditions are adjusted to obtain a desirable ethylene concentration, usually between about 2 and 5% by weight, in the solution. Thus, ethylene can be charged through line 10 at pressures between about 100 and about 2000 p.s.i. and absorption can be effected at temperatures between about 15° C. and about 35° C. Residual gases are vented from absorber 11 through valved line 13. The ethylene solution is withdrawn from the lower portion of the absorber through line 14 and pump 15, thence through line 16 and heater 17 into the polymerization reactor 18. The temperature of the solution is brought to a desired value, for example between about 90° C. and about 180° C. in heat exchanger 17.

Reactor 18 is provided with a suitable mechanical stirrer 19 and suitably designed vertical and/or horizontal baffles (not shown) to effect the desired degree of contacting of ethylene with a slurry of catalyst particles in the liquid hydrocarbon reaction medium. Fresh catalyst is charged to the system through valved line 20 into a hopper 21 provided with a drawoff valve 22, thence into a slurrying vessel 23 provided with a suitable agitator 24. Recycle solvent is passed through valved line 80 into the slurrying vessel and the resultant slurry of supported vanadium oxide catalyst in solvent is withdrawn through valved line 25 into reactor 18.

A solution containing up to about 5% by weight of normally solid ethylene polymers and slurried vanadia catalyst is withdrawn from the reactor through line 26 into one or more flash chambers indicated schematically by vessel 27. Line 28 containing a pressure-reducing valve 29 is joined to the upper end of flash drum 27 and functions to recycle withdrawn gases to feed line 10 and/or to discharge gases from the system through valved line 30. Drum 27 may take the form of a hydroclone.

Desired conditions of temperature and pressure are maintained in drum 27, for example, temperatures between about 90° C. and about 200° C. and pressures between about 10 and about 200 p.s.i.g. The solution of polymers containing suspended catalyst particles is withdrawn from the lower end of drum 27 through line 31, whence a portion thereof can be recycled through valved line 32 to the polymerization reactor and the net effluent withdrawn through valved line 33 and heat exchanger 34 into equipment for catalyst separation indicated schematically by 35. The temperature in heat exchanger 34 is maintained at a sufficiently high value to retain the normally solid polymer in solution in the hydrocarbon reaction medium during the ensuing step of catalyst separation. When equipment 35 takes the form of a filter, it is desirable to add a suitable filter aid, such as an acid-treated clay, porous adsorbent carbon or mixtures thereof through valved line 36. A centrifuge, or assemblies of filters and centrifuges in series, can be used for the separation of catalyst particles. In one method of operation, a small proportion up to about 3 weight percent of the solid polymer may be precipitated with the catalyst particles by suitably lowering the temperature of the solution in order to increase the extent of removal of catalyst particles from the solution.

The resultant solution is withdrawn from equipment 35 through line 37 into heat exchanger 38 wherein the temperature of the solution is low enough to precipitate substantially all of the polyethylene from the solution in filter 40, usually a temperature between about 20° C. and about 75° C. The solid polymer product is withdrawn from 40 through line 41 by suitable known mechanical means for heat and vacuum treatment in equipment designated schematically by 42. Thus, equipment 42 can comprise known vacuum extrusion equipment for solid polymers, wherein the solid polymer is heated to a temperature between about 40° C. and about 200° C. under a pressure between about 0.1 and about 10 p.s.i.a. to remove occluded solvent. The polymer product is withdrawn through line 43 for such further treatment as may be desired.

Filtrate is withdrawn from equipment 40 through valved line 44, whence all or a portion can be recycled through valved lines 45 and 46 to line 12 and absorber 11. A slip stream of solvent is withdrawn from line 44 through line 47 into a fractionating tower 48. Polymer products having a grease-like consistency at room temperature are withdrawn from the lower portion of column 48 through valved line 49. When alkylatable aromatic hydrocarbon solvents are employed, alkylates thereof are also withdrawn through line 49. The purified solvent passes overhead of column 48 through line 50, condenser 51, into a surge drum 52. The purified solvent can be withdrawn from drum 52 through valved line 53 to reflux column 48 and the net purified solvent is withdrawn through line 54, thence into line 46 for recycle to the absorber 11.

The catalyst particles containing more or less occluded or precipitated solid polymers are withdrawn from separator 35 through line 55 into catalyst extraction equipment, indicated schematically by vessel 56. Vessel 56 can be provided with suitable mechanical agitators or it can be a pulsed column or other known equipment which is adapted to the extraction of solid polymers from the catalyst particles. Usually the solvent employed in this extraction process is the same as that employed in the polymerization process, although it may be used at higher temperatures and pressures and in a higher ratio to the catalyst in order to attain the desired degree of extraction of normally solid polymers from the catalyst particles. A suitable solvent such as hot xylenes, nonane, decane, etc. is passed from an accumulator 57 through valved line 58 into line 55, thence into extraction equipment 56.

The catalyst extraction conditions can be varied widely to attain the desired objective, but usually temperatures between about 140° C. and about 300° C. are employed and a solvent:catalyst weight ratio of at least about 5 gallons per pound, usually between about 10 and about 100 gallons of solvent per pound of catalyst.

The resultant polymer solution containing catalyst particles in suspension is withdrawn from equipment 56 through valved line 59, whence at least a portion thereof is passed through valved line 60 for recycle through the catalyst-and-polymer separation equipment previously described. The remainder of the contents of line 59 is passed through valved line 61 into equipment 62, adapted to separate the catalyst particles, for example, a filter, centrifuge or other known equipment. The solvent, containing more or less solid polymer in solution, is withdrawn through line 63 to accumulator 57 or a portion thereof can be diverted through valved line 64 and heat exchanger 65 for passage into filter 40 to effect filtration of normally solid polymer therefrom.

The extracted catalyst is withdrawn from equipment 62 by suitable means through line 66 into vessel 67, wherein occluded solvent is removed. Thus a stripping gas such as steam or nitrogen is introduced into 67 through line 68. The dried catalyst is withdrawn from 67 through line 69 into equipment indicated schematically by 70, wherein carbonaceous residues are removed from the extracted catalyst by combustion. Equipment 70 can take the form of a wedge burner, a rotary kiln, a fluidized catalyst regeneration vessel such as is employed in regenerating powdered catalytic cracking catalysts, etc. An oxidizing gas stream such as air, flue gases containing small proportions of oxygen (1–10 v. percent, for example), or the like is introduced into equipment 70 through line 71 and combustion gases are withdrawn through line 72. An internal cyclone separator may be employed in equipment 70 or an external cyclone to effect separation of fine catalyst particles from combustion gases and their recycle to equipment 70. The regenerated catalyst is withdrawn from the equipment 70 through line 73 for recycle to storage hopper 21.

Stripping gases containing solvent vapors are withdrawn overhead of drum 67 through line 74, thence through partial condenser 75 into fractionating column 76, whence purified solvent is taken overhead through conventional equipment and the net purified solvent is passed by line 77 into accumulator 57. Bottoms which may contain impurities or condensed stripping steam are removed from column 76 through valved line 78.

While we have specifically described a slurry-type polymerization process, our invention is not thus limited. Thus, ethylene can be polymerized from the gas phase employing a fixed or motionalized (e.g., fluidized) catalyst bed which can be extracted and regenerated.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc.

The polymers produced by the process of the present invention, especially the polymers having high specific viscosities, can be blended with other solid polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products having a molecular weight of 50,000 or more produced by the present invention can be employed in small proportions to substantially increase the viscosity of fluent liquid hydrocarbon oils and as gelling agents for such oils.

The polymers produced by the present process can be subjected to chemical modifying treatments, such as irradiation with ionizing radiations; halogenation, halogenation followed by dehalogenation; sulfohalogenation, e.g., by treatment with sulfuryl chloride; sulfonation, graft copolymerization and other reactions to which hydrocarbons may be subjected.

Having thus described our invention, we claim:

1. A process for the preparation of a normally solid polymer which comprises contacting ethylene with a catalyst consisting essentially of a minor proportion by weight of an oxide of vanadium, whose surface is free of sorbed hydrogen, extended upon a major proportion by weight of an inert solid supporting material, and effecting said contacting under polymerization conditions including a suitable temperature between about 35° C. and about 260° C.

2. The process of claim 1 wherein said supporting material is a porous, difficultly reducible metal oxide.

3. The process of claim 2 wherein said difficultly reducible metal oxide is a gamma-alumina.

4. A process of claim 2 wherein said difficultly reducible metal oxide is titania.

5. The process of claim 2 wherein said difficultly reducible metal oxide is zirconia.

6. The process of claim 2 wherein said difficultly reducible metal oxide is a silica-alumina.

7. The process of claim 2 wherein said difficultly reducible metal oxide is silica.

8. The process of claim 1 wherein said oxide of vanadium comprises $V_2O_5$.

9. The process of claim 1 wherein said oxide of vanadium comprises $V_2O_3$.

10. The process of claim 1 wherein said contacting is effected in the presence of a liquid hydrocarbon reaction medium.

11. A process for the preparation of a normally solid polymer which comprises contacting ethylene in the presence of a liquid hydrocarbon reaction medium under polymerization conditions including a suitable temperature between about 90° C. and about 180° C. with a calcined catalyst consisting initially of a minor proportion by weight of $V_2O_5$ supported upon a major proportion by weight of a porous, difficultly reducible metal oxide, recovering from said process a catalyst containing occluded normally solid polymer, extracting at least a fraction of said normally solid polymer from said catalyst, thereafter removing carbonaceous residues from the extracted catalyst by oxidation, and returning catalyst thus regenerated and oxidized to said process.

12. The process of claim 11 wherein said difficultly reducible metal oxide comprises gamma-alumina.

References Cited in the file of this patent

UNITED STATES PATENTS

| | | |
|---|---|---|
| 2,780,617 | Zletz | Feb. 5, 1957 |
| 2,791,575 | Feller et al. | May 7, 1957 |